Feb. 27, 1962 E. T. Y. GRAY 3,022,909
AGRICULTURAL MACHINERY
Filed June 27, 1958 7 Sheets-Sheet 1
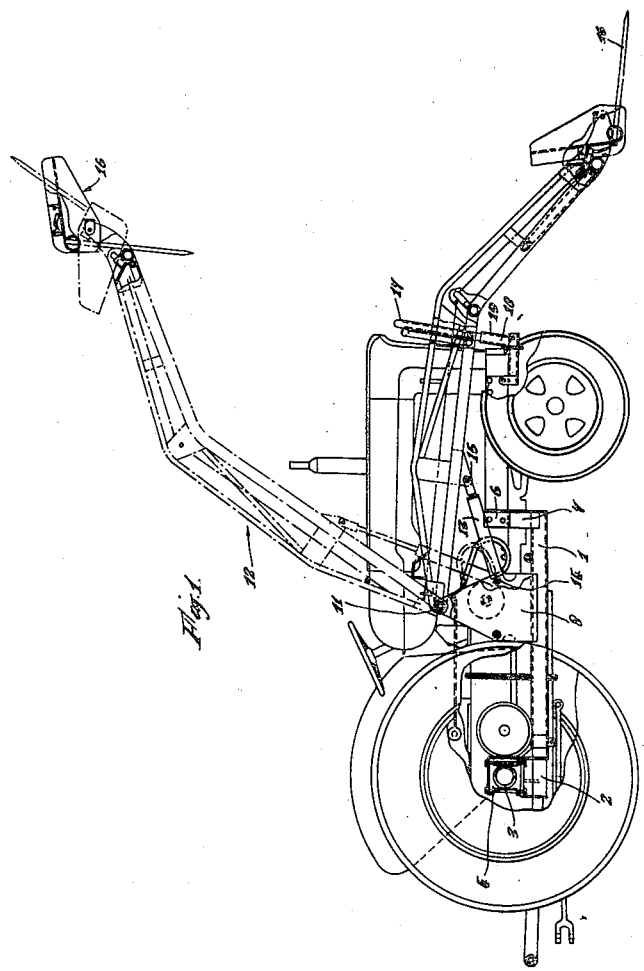
INVENTOR
EDDIE T. Y. GRAY
BY Robert A. Sloman
ATTORNEY Feb. 27, 1962     E. T. Y. GRAY     3,022,909
AGRICULTURAL MACHINERY
Filed June 27, 1958     7 Sheets—Sheet 2
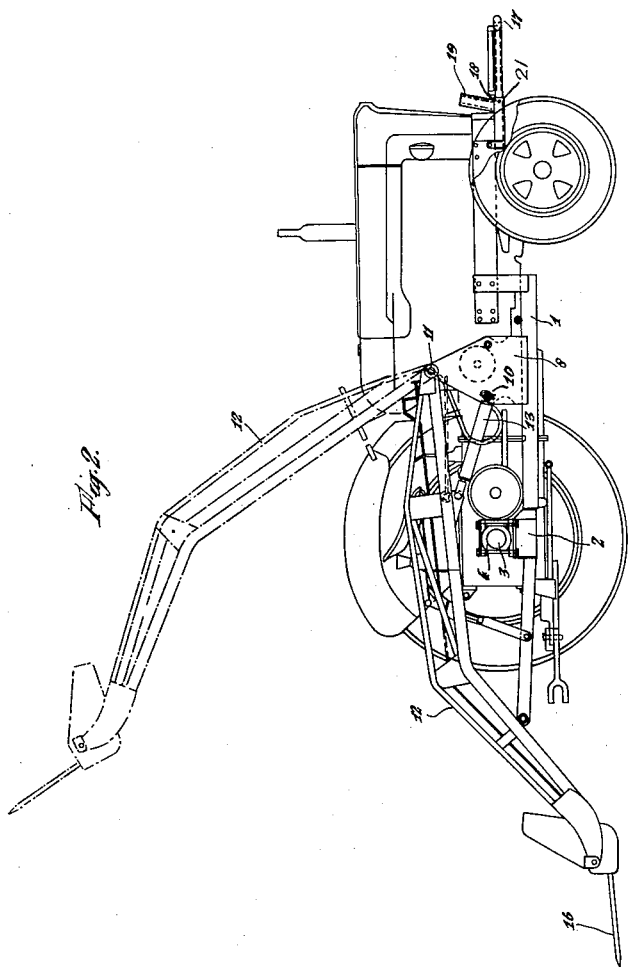
INVENTOR
EDDIE T. Y. GRAY
BY Robert A. Sloman
ATTORNEY

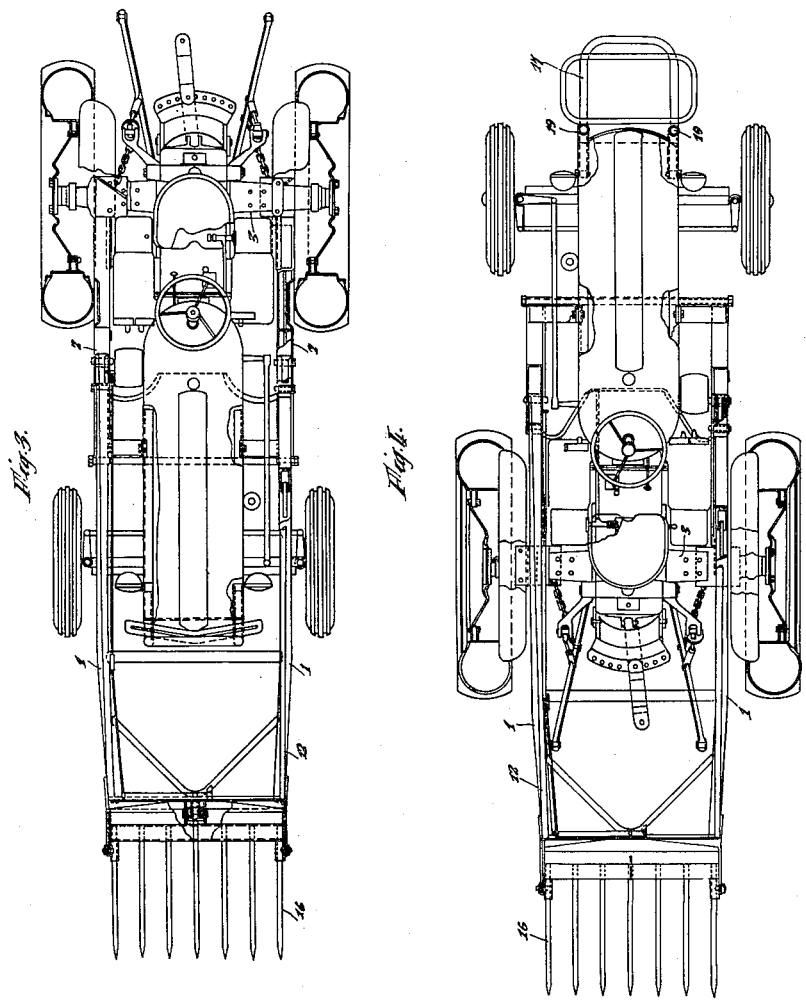

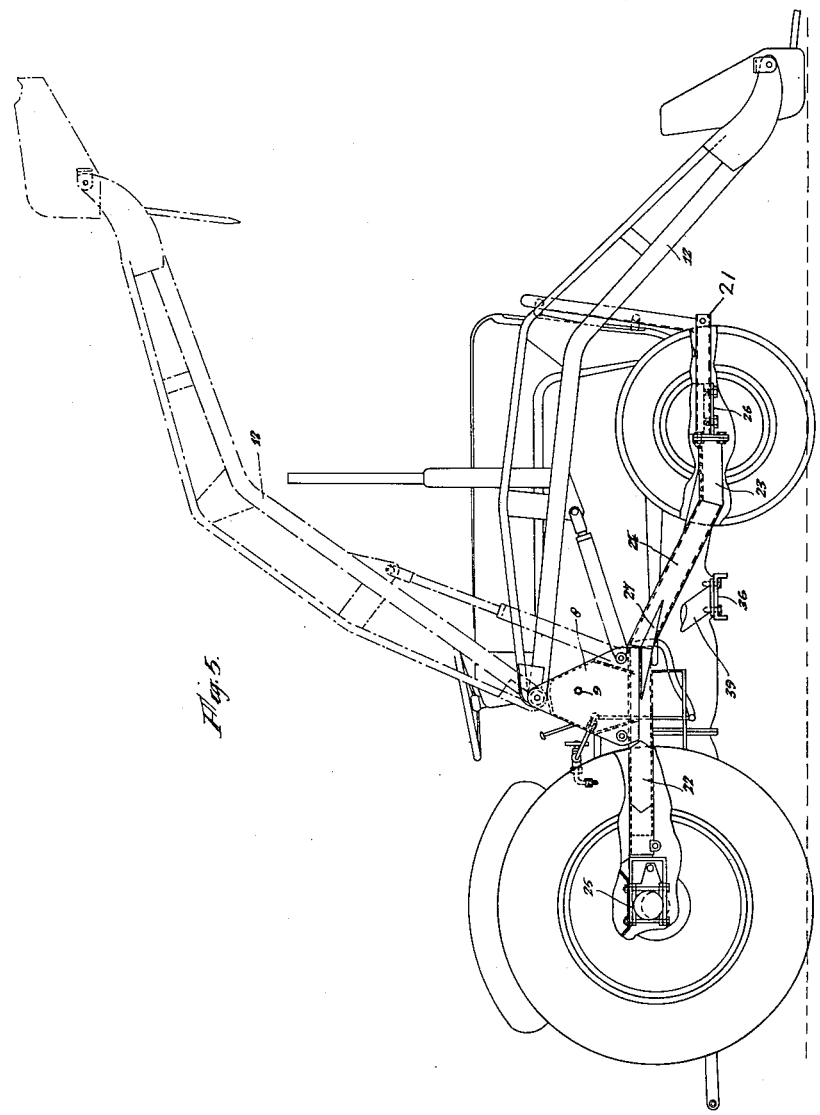

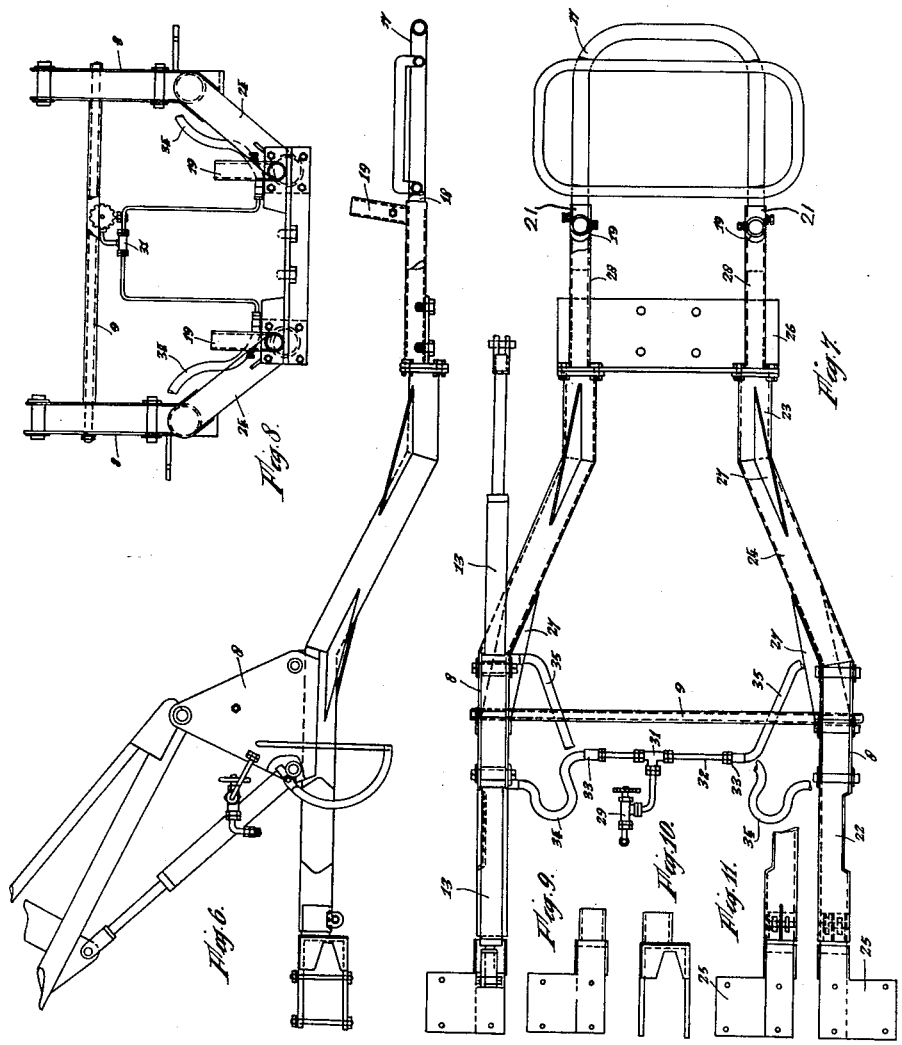

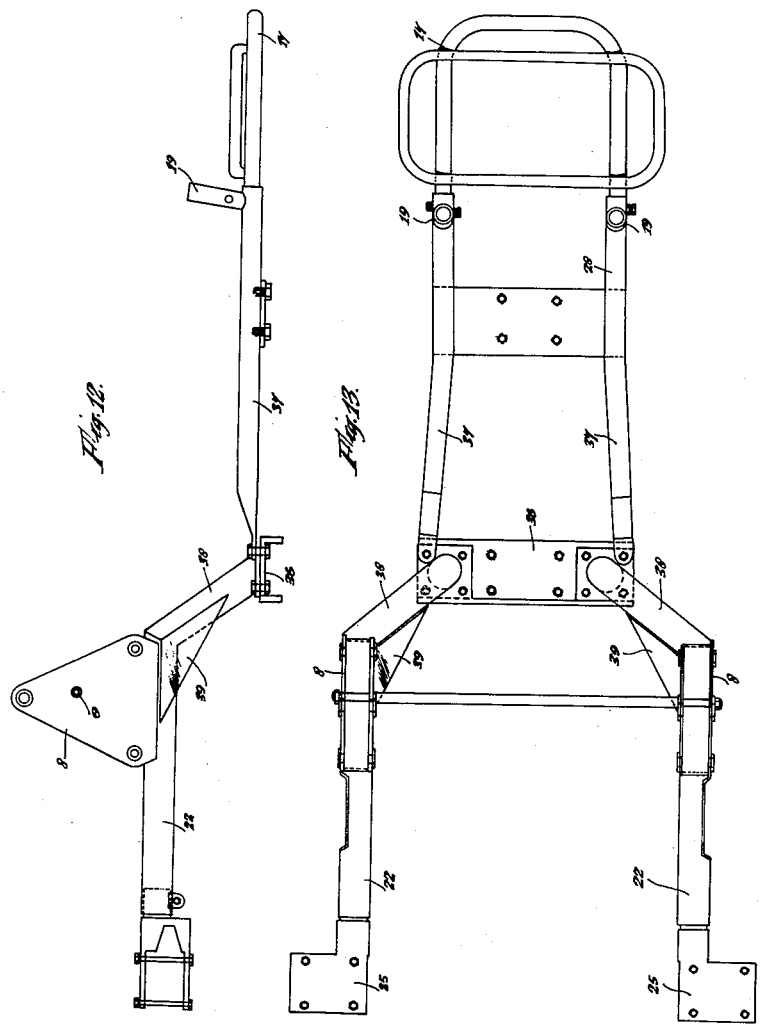

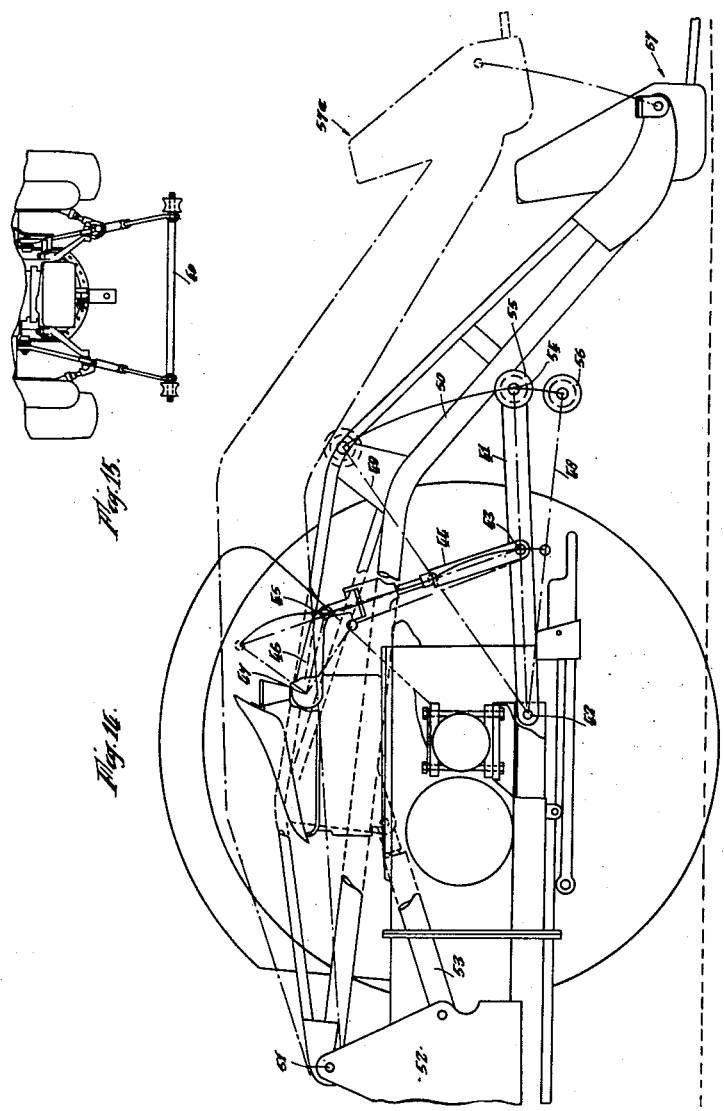

United States Patent Office 3,022,909
Patented Feb. 27, 1962

3,022,909
AGRICULTURAL MACHINERY
Eddie T. Y. Gray, Mintlaw Station, Fairbank,
Fetterangus, Scotland
Filed June 27, 1958, Ser. No. 745,081
Claims priority, application Great Britain Nov. 29, 1957
5 Claims. (Cl. 214—131)

This invention relates to agricultural machinery and in particular to load elevating equipment which can be fastened upon an agricultural tractor.

Equipment of this sort is known in which a pair of laterally spaced arms are pivotally mounted upon a sub-assembly carried upon the tractor and may be raised or lowered by means of a hydraulic mechanism which is actuated from the tractor's hydraulic power-take-off supply. The arms extend beyond the tractor and may carry upon their end an implement such as a manure fork, an earth scoop, a buck rake, a hay sweep or the like and these may be actuable either by manual means extending down the length of the arms to a control which may be manipulated by the tractor driver, or else by a hydraulic means in which case a hydraulic extension is carried up the arms from a suitable control device accessible to the driver.

Other implements may also be carried upon the end of the arms remote from the tractor. Thus, power driven mower hedge trimmers, hole drilling attachments, side rakes, saw blades, ditching attachments, post hole borers, and like equipment may be carried upon the end of the loader arms. When the arms extend rearwardly from the tractor, such implements may be driven from the rear power-take-off shaft by suitable lengths of flexible drive, by shafts incorporating universal joints, or by arrangements of V-belts, chains or gears. Alternatively, such equipment may be hydraulically operated, in which case it may be driven from the hydraulic power-take-off supply from the tractor. It will be appreciated that where a hydraulic power supply is utilized, the equipment may be carried upon the arms where these extend forwardly or rearwardly of the tractor.

Elevating equipment of this sort has been provided in which the arms extend to carry the implements forwardly of the tractor. This is convenient for many purposes, particularly where it is desired to carry a load a considerable distance when the advantage of the forward speed of the tractor can be utilized. This arrangement with the implement extended to the front of the tractor is not, however, so convenient for use in confined spaces, or where a greater pushing power is required, for example for digging purposes. Under these circumstances a load elevating equipment in which the arms extend outwardly over the rear of the tractor is more suitable, since greater use can then be made of the tractor's steering to allow the load to be handled within a confined and limited space, and where a greater pushing power can be obtained due to the tractor's low reverse gear.

It is an object of the present invention to provide a load elevating attachment for an agricultural tractor which will overcome these disadvantages and which may be used with the elevating arms extending either forwardly over the front of the tractor or rearwardly behind the tractor. Thus, the loader may be used in whichever position is most convenient and a farmer may be provided with a loader which is versatile and which will perform any function which could normally be expected from either a front extending loader or a rear extending loader.

It is a further object of the invention to provide a load elevating attachment which can be very quickly and easily removed from the tractor when the tractor is required for other purposes.

According to the invention a load elevating attachment for an agricultural tractor is provided which comprises a sub-frame to be mounted upon the tractor, a pair of laterally spaced apart elevating arms to be pivotally mounted upon said sub-frame, means for mounting a load carrying implement between the ends of the arms remote from the sub-frame and one or more hydraulic mechanisms to be operatively connected between the sub-frame and the arms to raise and lower these, the elevating arms being mountable on the sub-frame to extend either forwardly or rearwardly of the tractor and the hydraulic mechanisms being mountable to control the movement of the elevating arms whether these extend forwardly or rearwardly of the tractor.

Thus, with the load elevating attachment according to the invention, the sub-frame may be constructed so that it can be fitted to the tractor and left more or less permanently in position, the sub-frame being constructed so that it can be rigidly secured to convenient points upon the tractor or its chassis, and so that it will not in any way interfere with the normal performance of the tractor. The load elevating arms, which will normally be secured together into a single assembly by suitable cross bracing members, will normally be attached to the sub-frame by means of stout pivot pins, passing through aligned apertures in a fitting upon the sub-frame, and in the ends of the load elevating arms. The arms may be secured to the sub-frame so that they extend forwardly of the tractor or so that they extend rearwardly of the tractor and the same pivot point may be used whichever way the arms extend, or alternatively separate pivot points may be provided upon the sub-frame to which the elevating arms can be pivotally attached according to whether they extend forwardly or rearwardly. The hydraulic mechanism may then be interposed at a convenient point between the elevating arms and the sub-frame and connected to the tractor's hydraulic supply so that the arms may be actuated.

Thus, with the attachment according to the invention, the sub-frame may be fitted to the tractor and left in position upon the tractor for as long as is desired, there being no necessity to remove the sub-frame from the tractor when it is required for normal use. If the elevating mechanism is to be secured to the tractor, the elevating arms are lifted into position extending either forwardly or rearwardly of the tractor, and the pivot pins are placed in position and locked, for example by spring clips, cotter pins, or nuts. The hydraulic mechanisms are then brought into position and can be fastened between the elevating arms and the sub-frame by the insertion of a further two pivot pins. The hydraulic mechanisms can then be connected to the tractor's hydraulic supply through the control mechanism for the elevating attachment and the desired implement can be secured to the outer end of the elevating arms, again usually by the insertion of one or two or more pins or bolts. The mechanism is then ready for use. If it is desired to change the attachment over, for example from forward extending use to rearward extending use, then all that has to be done is to uncouple the elevating arms and the hydraulic mechanisms, turn them round, and reconnect them. This only necessitates the removal and replacement of a few pivot pins and can be dealt with even by an unskilled person in a matter of a few minutes.

In order that the elevating arms can be depressed fully when they are arranged to extend rearwardly of the tractor, and in order to leave the tractor driver ample room to manipulate both the controls of the tractor and the controls for the elevating arms and for any mechanical equipment carried upon the elevating arms, without any danger, it is desirable that the arms should be widely spaced apart and should pass between the wheels and mudguards of the tractor and the central portion of the chassis thereof. This will make it normally necessary for the rear wheels of the tractor to be moved outwardly from their normal position and the mudguards either to be removed or, where provision is made for their position to be adjusted, for them to be moved outwardly with the wheels. In many tractors the wheels can be moved outwardly by removing them, turning them about, and replacing them. Since the portion of the wheel disc which bolts to the tractor wheel hub is eccentric of the plane of the wheel, and is normally more closely adjacent to the outer face of the wheel than to the inner face, the turning about of the wheels results in the tire and rim portions thereof being moved outwardly from the tractor. This is particularly advantageous since when the wheels are turned about, the tread of the tires is reversed. This results in a greatly increased tractive effort being available when the tractor is driven in reverse, and this, together with the low ratio of the reverse gear of a tractor, results in a very considerable pushing power being available in reverse when the tractor is to be used for digging or for like purposes. If desired, the sub-frame may itself be provided with suitable support means for the mudguards so that, if the tractor is not fitted with means allowing these to be moved outwardly, they may be supported upon the sub-frame rather than be removed.

When the elevating arms extend rearwardly of the tractor and are being utilized for digging or for other heavy lifting operations, it is sometimes desirable that a greater lifting force should be available than can be obtained by the normal hydraulic elevating mechanisms. This force is particularly useful to provide a tear away lift, for example when a fork upon the elevating arms is being used to load manure from a heap. Such an extra lifting force is only required when the arms extend rearwardly of the tractor, since in this position the loading upon the end of the arms is largely carried upon the rear wheels of the tractor which causes these to gain a greater purchase upon the ground and so to maintain the digging implement forced hard into the material which is being dug. When the arms are located forwardly of the tractor heavy loading upon the end of the arms, such as may be obtained when digging, causes the rear wheels to tend to lift slightly from the ground. This reduces their forward tractive effort and so allows the tractor to slip back a short distance with a result that the digging implement tends to pick up a smaller load, the picking up of which does not require any additional lifting effort.

In accordance with a further aspect of the invention, the conventional rear lifting arm mechanism of the tractor can be utilized to provide an additional lifting force to the rearwardly projecting elevating arms over at least a part of their elevating movement.

One convenient manner in which this may be done is to connect the rear lower lift arms by means of a suitable shaft, this shaft carrying at appropriate points a pair of rollers formed with a concave periphery to engage the elevating arms when these extend rearwardly of the tractor and are in the lower position. By actuating the lower lift arms at the same time as the normal hydraulic elevating mechanism, these can be utilised in conjunction to provide a very high lifting force over at least the initial range of lifting movement of the elevating arms. It has been found in practice that the tear away lift obtainable can be at least doubled by this means.

It will be appreciated that the rear lower lift arms can be utilized to increase the lifting force of the elevating arms by other means than the use of a shaft carrying concave rollers. Upon other tractors it may be that the rear lifting arms or a part of the mechanism actuating this may be located above the level of the elevating arms. In this case, other forms of connection may be provided to produce an upward lift applied to the elevator arms by the lift arm mechanism.

It is well known that when elevating attachments of the character to which the invention relates are used upon the tractor, if they are used with a heavy load, there is some danger that either the front or rear end of the tractor may be lifted from the ground at least to such an extent as to make it difficult to control it. Where the elevating arms extend forwardly of the tractor, this can easily be countered by using the lift bars at the rear of the tractor to support a heavy weight, for example a block of concrete which is cast with hooks extending from its upper surface which can be engaged by the lift bars to raise it off the ground. Where the elevating arms extend rearwardly of the tractor, however, there is the danger that the front wheels may be lifted from the ground at least sufficiently to lose their adhesion so that the tractor loses its steering power.

It is also known that when a load elevating attachment is being used with the elevating arms extending forwardly of the tractor, it is desirable to provide a stout radiator guard a short distance in front of the tractor radiator so that the radiator cannot be damaged if the tractor is inadvertently run into a trailer or other obstacle while trying to maneuver very close to this to discharge its load into or onto it.

The present invention therefore additionally provides a structure which can be utilized as a radiator guard when the tractor is to be used with the elevating arms in the forwardly extending position and which can be lowered when the tractor is to be used with the arms extending rearwardly to provide a support upon which ballast such as sandbags or concrete blocks might be carried to weight down the front end of the tractor to insure that front wheel adhesion is maintained.

The combined radiator guard and ballast tray may conveniently be completely constructed of tubular steel. The tray may be of a suitable construction and form to provide an adequate guard for the radiator when it is mounted in a vertical position by inserting two arms extending therefrom into tubular sockets carried upon the tractor or upon the sub-frame and locking these arms in position. A second pair of similar arms may then be provided disposed at right angles to the first pair so that by removing the guard and inserting the alternate pair of arms into the sockets the guard is arranged to extend horizontally from the front of the tractor to provide a ballast tray.

In order that the invention may be clearly understood, some embodiments thereof will now be briefly described by way of example only with reference to the accompanying diagrammatic drawings in which FIG. 1 is a side elevation showing an elevator mounted in a forwardly extending position on a Fordson Major tractor, FIG. 2 shows in side elevation an elevator mounted in a rearwardly extending position upon a Fordson Major tractor, FIG. 3 shows a plan view of an elevator mounted in a forwardly extending position on a Fordson Major tractor, FIG. 4 shows a plan view of an elevator mounted in the rearwardly extending position on a Fordson Major tractor, FIG. 5 is a side elevation showing an elevator mounted in the forwardly extending position on a Massey Ferguson 35 tractor, FIG. 6 shows a side elevation of the elevator sub-frame shown in FIG. 5 with the elevating arm extending in the rearwardly extending position, FIG. 7 is a plan view of the elevator sub-frame shown in FIG. 5 showing the hydraulic oil supply system, FIG. 8 is a front elevation of the elevator sub-frame shown in FIG. 5, FIG. 9 is a plan view of the rear sub-frame mounting bracket for use with Ford Ferguson, Ford Minor, Fordson Dearborn, Massey Ferguson, and Ferguson 35 tractors, FIG. 10 is a side elevation of FIG. 9, FIG. 11 is a plan view of the part shown in FIG. 9 showing the right hand mounting bracket from below, FIG. 12 shows in elevation an alternative method of mounting the sub-frame of the elevator to a Massey Ferguson 35 tractor, FIG. 13 shows a plan of the sub-frame of FIG. 12 with the ballast tray in position, FIG. 14 is a side elevation of a Fordson Major tractor showing the lower lift arms arranged to provide a supplementary tear away lifting force to the rearwardly extending elevating arms, and FIG. 15 shows a plan view of the rear end of a Nuffield Universal 111 tractor, the lower lift arms of which are fitted to operate in the same manner as that described with reference to FIG. 14.

In FIG. 1 a Fordson Major tractor is shown with an elevator according to the invention fitted to extend forwardly from it to carry a manure fork at the extremity of the elevating arms. The hatched lines show the elevating arms in the raised position and the fork tipped.

The elevating attachment is supported upon the tractor by means of a sub-frame. This is made up of a pair of side members 1 extending parallel to one another along each side of the tractor and being rigidly secured to the tractor at convenient points. The rear end of the frame 2 is secured to the rear axle casing 3 by means of a bolted clamping fitting 4, while the front end 5 is secured to the tractor's mid mounting position 6 by means of a bracket 7. It will be appreciated that the form of the sub-frame and the method of mounting it upon the tractor will be different for almost every make and model of tractor, and that alternative constructions and methods of mounting may be used even upon the same make and model of tractor. The sub-frame may incorporate any cross bracing or transverse members desired, and essentially provides a rigid frame, usually of steel girder sections which can be readily mounted upon a tractor without any modifications to the tractor and which can be left in position upon the tractor for as long as is desired without in any way restricting the normal use to which the tractor may be put.

The sub-frame carries a pair of stout triangular shaped plates 8 extending parallel at both sides of the tractor and rigidly supported in position. These will generally be welded to the frame members 1 and may also be cross braced by a rod or other member 9 extending between the plates. An aperture 11 at the apex of the plates 8 provides for the pivotal mounting of the elevating arm structure 12. The elevating arms will normally be pivoted in position by means of a suitable pin or bolt passing through the aperture 11 and a corresponding aperture in the end of the elevating arm structure and held in position by a simple locking means which can easily be removed, such as a split pin or a nut. The elevating mechanism 13 is pivotally mounted between the plate 8 and the elevating arm assembly 12. At the end where it is connected to the plate 8 an easily removable pin is passed through an aperture 14 in the plate 8 and a corresponding aperture in a fitting upon the end of the hydraulic expansion cylinder which constitutes the elevating mechanism. At the other end a similar attachment is provided at 15.

Suitable hydraulic connections are established between the hydraulic power take off supply of the tractor, an arrangement of control valves, and the hydraulic expansion cylinders 13. In use, the expansion of the elevating mechanisms 13, by the supply of hydraulic fluid under pressure to them causes the elevating arm assembly 12 to be raised about the pivot point 11 in the manner which is clearly shown in the drawings. If the device which is carried at the outer end of the elevating arms requires any hydraulic power supplies or any controls, these may be carried by the elevating arm assembly 12 and connected to appropriate points upon the control mechanism at the same time as the elevating arms are fastened in position.

As can clearly be seen in FIG. 1, when the tractor is being used to load material on to a truck or trailer, the fork 16 is tipped in the elevated position to drop the material carried only a short distance in front of the tractor. This means that the tractor must be driven very close to a truck or trailer on to which the material is to be deposited and there is in consequence some danger that the tractor may hit this. In order to prevent the tractor radiator being damaged if this should occur, a radiator guard 17 may be provided. This may be completely fabricated in steel tubing or may be of a simple girder construction, and may be held in position by inserting the free ends 17 of the guard structure into tubular sockets 19 provided upon the front end of the tractor. These sockets may be either carried upon the tractor itself or where the sub-frame assembly extends right to the front of the tractor they may be formed in or carried upon the front end of the sub-frame.

FIG. 2 shows the same tractor as in FIG. 1 with the elevating attachment extending rearwardly from the tractor. All that is necessary to move the elevator from the forwardly directed position to the rearwardly directed position is to uncouple the hydraulic connections to the elevating mechanism 13, to remove the pivot pins 11 and 14, to place the arms in the rearwardly facing position, and to reinsert the pivot pins 11 and 14 and recouple the hydraulic connections. As will be seen from FIG. 2, when the elevating arms extend rearwardly of the tractor the pivot pin 14 is passed through the third aperture 10 in the plate 8 instead of the forward aperture in which it was originally located.

With some tractors there may not normally be sufficient space for the rearwardly directed elevating arms to pass between the rear wheels of the tractor and the inside rear frame thereof. In this case it is necessary to move the wheels outwardly from their normal position in order to obtain the additional clearance necessary. On some tractors this can be done very simply, since provision is made for allowing the track of the rear wheels to be varied. On other tractors, the same effect can be easily achieved by taking off the rear wheels, turning them over and replacing them. Since the portion of the wheel disc which bolts to the tractor wheel hub is eccentric of the plane of the wheel, and is normally more closely adjacent the outer face of the wheel than the inner face, turning the wheels over results in the tire and rim portions of the wheel being moved outwardly from the hub of the tractor. This operation offers additional advantages, since turning the wheels over also serves to reverse the tread of the tires relative to the tractor which provides the tractor with a greater tractive effort in reverse which can be utilized to great advantage when the elevating mechanism carries a digging attachment and rearward thrust by the tractor can assist in the loading of the digging attachment. It is also necessary to move the mudguards outwardly with the wheels or alternatively to remove them altogether.

When the elevating attachment is being used in the rearwardly directed position, and is being used to lift heavy loads some difficulty may be experienced in that the weight of the load may tend to lift the front wheels of the tractor to such an extent that they lose their grip upon the earth so that steering control is lost. In order to prevent this happening the radiator guard 17 may be removed and may be remounted in a horizontal position by inserting the ends 18 into receiving sockets 21 therefor. With the radiator guard mounted in this position it can be used as a ballast tray to hold a large block of stone or heavily loaded sack which will serve to keep the front end of the tractor in firm adhesion with the ground. If this same problem should arise when the elevating arms are mounted forwardly of the tractor and rear wheel adhesion should be lost, then the rear lower lift arms of the tractor can be used to carry a similar load to the same effect.

In FIGS. 3 and 4 the Fordson Major tractor of FIGS. 1 and 2 with the elevating attachment mounted in forwardly and rearwardly extending positions is shown in plan. These views show the arrangement which has been described with reference to FIGS. 1 and 2 and also allow the construction of the radiator guard ballast tray to be more clearly seen.

FIG. 5 shows an elevator mounted upon a Massey Ferguson 35 tractor, and it will be seen from this figure that while the general arrangement of the elevating arms and elevating mechanisms is exactly the same as that already described, the sub-frame is of rather different construction and is differently mounted upon the tractor. The sub-frame, together with the general arrangement of the hydraulic supplies is shown in detail in FIGS. 6, 7, and 8.

The sub-frame shown in FIGS. 5, 6, 7 and 8 consists of a rear portion 22 which is joined to a front portion 23 by a downwardly and inwardly inclined portion 24. The rear portion is provided at its rear end with an attachment 25 which can be bolted about the rear axle shaft casing of the tractor to mount the rear end of the sub-frame rigidly in position. The front of the portion 23 of the sub-frame is secured to a plate 26 which extends transversely across the front of the underneath portion of the tractor and which is mounted to the tractor to secure the front end of the sub-frame rigidly in position. Between the portions 22 and 24 and 23 and 24 of the frame, reinforcing webs 27 are welded to increase the rigidity of the frame. The triangular plates 8 are welded to the frame and are connected by a cross bracing member 9 which serves to additionally stiffen both the sub-frame and the plates 8 which carry the elevating arms and the elevating mechanism. Tubular extensions 28 are provided extending forwardly from the plate 26 and these terminate in upwardly extending sockets 19 and forwardly extending sockets 21 to receive the ends 18 of the ballast tray radiator guard.

In FIG. 7, one of the plates 8 is shown carrying an elevating mechanism 13 shown extending forwardly of the sub-frame in the fully extended position, and a second elevating mechanism 13 extending rearwardly in the fully contracted position. The hydraulic power-take-off supply from the tractor is taken to a valve 29 and thence to a T-piece 31 and through a system of hydraulic conduits 32. From terminals 33 upon these conduits the supply may be carried by means of pipes 34 to the elevating mechanisms 13 when these are in the rearwardly disposed position or through pipes 35 to the elevating mechanisms 13 when these are in the forwardly directed position. The hydraulic connections 33 may conveniently include valves which are closed as the connections are broken so that the disconnection and reconnection of the hydraulic lines will not lead to a loss of hydraulic fluid or the inclusion of air in the hydraulic system. The valve 29 will normally be a three position valve which will allow hydraulic fluid to be fed to the mechanisms 13 to elevate the arms, which will allow fluid to be drawn from the mechanisms 13 to lower the arms and which will have an off position to allow the arms to be maintained in a stationary position.

FIGS. 9, 10 and 11 show modified rear sub-frame mounting brackets which could be used with the sub-frame shown in FIGS. 5, 6, 7 and 8 to mount this upon different tractors.

FIG. 9 is a plan view of a mounting bracket suitable for use with Ford Ferguson, Ford Minor, Fordson Dearborn, Massey Ferguson and Ferguson 35 tractors.

FIG. 10 is a side elevation of FIG. 9 and FIG. 11 is an underneath plan view of the right hand mounting bracket.

FIGS. 12 and 13 show in elevation and plan respectively an alternative method of mounting the subframe shown in FIGS. 5 to 8 to a Massey Ferguson 35 tractor.

In this arrangement a bearer member 36 is provided to be mounted to the mid bearer of the tractor.

This allows the plate 26 shown in FIG. 7 to be dispensed with, or a very much lighter weight plate 26 to be used between light weight tubular members 37 whose sole purpose is to support the radiator guard and ballast tray. The bearer member 36 is connected to the rear portion 22 of the sub-frame by a tubular member 38 and a stiffening web 39 may be provided between these two members. Fragmentary portions of the plate 36 and the member 38 are shown in FIG. 5 to show the position in which they are mounted upon the tractor and the method of their mounting. The sub-frame may otherwise be constructed, arranged and mounted in the same manner as the previous alternative sub-frame which has been described.

In FIG. 14 of the drawings an elevating equipment according to the invention fitted with a fork such as may be used in the digging of manure is shown mounted upon the Fordson Major tractor in such a manner that the lower rear lift arms of the tractor can provide an additional lifting force, particularly to provide a tear away lift. The lift arms 41 of the tractor are pivotally mounted to the tractor frame at 42 and are lifted by means of a coupling 44 pivotally connected to the arms 41 at 43. The upper end of the coupling 45 is in turn pivotally connected to a short arm 46 which is rotated about an axis 17 by suitable driving means when the lifting arms are to be raised. The lifting arms can be raised and lowered between an arc represented by the hatched lines 48 and 49.

The elevating arms 50 are pivotally connected at 51 to the upward extension of the sub-frame 52 and are normally elevated by means of the hydraulic elevating mechanism 53.

The apertures 54 in the ends of the lifting arms 41 are connected by a shaft or distance piece 40, the ends of which extend outwardly beyond the arms. Upon the ends of the shaft 40 are mounted a pair of pulleys 55 having a concave groove 56 in their periphery which is of a radius to engage the lower member of the elevating arm assembly 50. The pulleys may be retained upon the shaft 40 by any suitable means such as split pins.

In use, the elevating arms 41 are adjusted so that when the elevating arms 50 are in their lowermost position the pulleys 55 engage or are just below the elevating arms 50. If then the fork 57 is inserted into a load and upon operation of the appropriate controls the normal lifting mechanism 53 shows a reluctance to produce the necessary tear away force to lift the fork and its load, then the control to elevate the lower lift arms can also be actuated. These will rise and the pulleys 55 will bear upon the elevating arms 50 to greatly increase the force available to lift the fork 57 and its load. Once the fork 57 has reached the position 57a shown in hatched lines, the lift arms will no longer be able to assist the elevating mechanism 53 in raising the fork. By this time, however, the fork will only be carrying the material, e.g. manure with which it is loaded and its capacity will normally be such that the elevating mechanism 53 is adequate. The lifting arms serve to provide a tear away force to detach the material which is being loaded upon the fork from the general mass in which the fork is dug and upon a normal tractor the tear away force provided by the lifting arms and the elevating mechanism 53 can be more than twice the elevating force which is available from the mechanism 53 alone.

In FIG. 15 a plan view is shown of a similar installation upon a Nuffield Universal 111 tractor. The elevating arms have been omitted from this view in order to simplify it. It will be seen that the parts and arrangements and operation are exactly the same upon this tractor as upon the Ferguson Major.

What is claimed is:

1. A load elevating attachment for an agricultural tractor comprising a sub-frame mounted upon the tractor, a pair of laterally spaced apart elevating arms pivotally mounted upon said sub-frame, means mounting a load carrying implement between the ends of the arms remote from the sub-frame, hydraulic mechanism operatively connected between the sub-frame and the arms to raise and lower said arms, the elevating arms being mountable on the sub-frame to extend forwardly and rearwardly selectively of the tractor, the hydraulic mechanism being mountable to control the movement of the elevating arms when they extend selectively forwardly and rearwardly of the tractor, a pair of interconnected laterally spaced auxiliary lift arms pivotally mounted at their one ends upon said tractor, and underlying said elevating arms respectively, the other ends of said auxiliary arms operatively engageable with undersurface portions of said elevating arms, and tractor operated power means connected to said auxiliary lift arms intermediate their ends to provide an additional lifting force to the elevating arms over at least a part of their elevating movement.

2. In the load elevating attachment of claim 1, rollers on the said other ends of said auxiliary lift arms engaging said elevating arms respectively.

3. The load elevating attachment of claim 1, a shaft extending transversely through said other ends of said auxiliary lift arms, and rollers journaled adjacent the ends of said shaft engaging said elevating arms respectively.

4. A load elevating attachment for an agricultural tractor comprising a sub-frame mounted upon the tractor, a pair of laterally spaced apart elevating arms pivotally mounted upon said sub-frame, means mounting a load carrying implement between the ends of the arms remote from the sub-frame, hydraulic mechanism operatively connected between the sub-frame and the arms to raise and lower the said arms, the elevating arms being mountable on the sub-frame to extend forwardly and rearwardly of the tractor selectively, the hydraulic mechanism being mountable to control the movement of the elevating arms when extending selectively forwardly and rearwardly of the tractor, said tractor including a radiator at its front end, a pair of parallel spaced laterally interconnected horizontally disposed supports fixedly secured to said sub-frame and extending forwardly of said radiator, substantially upright mounting means adjacent the ends of said supports respectively, a substantially upright radiator guard, a pair of mounting elements depending therefrom respectively secured to said mounting means, said elevating arms extending rearwardly of their pivotal mounting, and horizontally disposed means on the ends of said supports to selectively receive said radiator guard mounting elements with said guard disposed horizontally to provide a ballast support to weigh down the front end of the tractor, said radiator guard adapted for selective use in an upright position when said elevating arms extend forwardly of the tractor.

5. In the load elevating attachment of claim 4, the mounting means of said radiator guard mounting elements to said supports including a first pair of spaced upright sockets, the said means on the ends of said supports for selectively receiving said mounting elements including a second pair of spaced sockets extending forwardly and substantially at right angles to said first pair of sockets respectively.

References Cited in the file of this patent
UNITED STATES PATENTS

| | | |
|---|---|---|
| 2,256,314 | Dunham | Sept. 16, 1941 |
| 2,465,476 | Pokorny et al. | Mar. 29, 1949 |
| 2,543,496 | Holopainen | Feb. 27, 1951 |
| 2,630,930 | Ulrich | Mar. 10, 1953 |
| 2,691,430 | Vanderhoef | Oct. 12, 1954 |
| 2,701,072 | Chambers et al. | Feb. 1, 1955 |
| 2,760,660 | Garner et al. | Aug. 28, 1956 |
| 2,841,299 | Gildner | July 1, 1958 |
| 2,874,489 | Orjala | Feb. 24, 1959 |

FOREIGN PATENTS

| | | |
|---|---|---|
| 728,608 | Great Britain | Apr. 20, 1955 |